Oct. 22, 1957         H. M. PREUSSER         2,810,657
METHOD OF PRODUCING SOY BEAN ADHESIVE COMPOSITION
AND PRODUCT DERIVED THEREFROM
Filed April 14, 1954
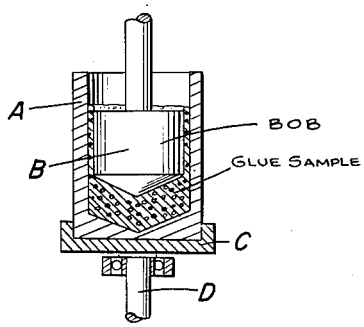
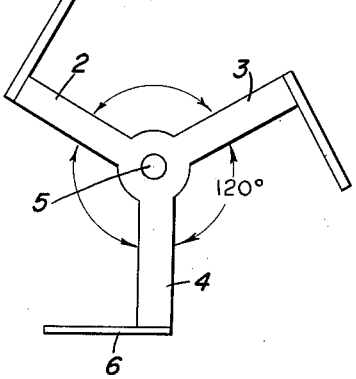
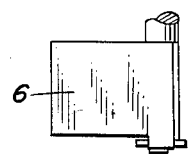
INVENTOR,
HENRY M. PREUSSER
BY
ATTORNEY

United States Patent Office 2,810,657
Patented Oct. 22, 1957

2,810,657

METHOD OF PRODUCING SOY BEAN ADHESIVE COMPOSITION AND PRODUCT DERIVED THEREFROM

Henry M. Preusser, Seattle, Wash., assignor to American-Marietta Company, Adhesive Resin and Chemical Division, Seattle, Wash., a corporation of Illinois Application April 14, 1954, Serial No. 423,053

8 Claims. (Cl. 106—154)

The present invention relates to the treatment of protein meals as, for example, soy bean meal, and the production of an adhesive composition therefrom.

Protein meals and especially soya meals with varying degrees of water soluble protein content are available for the production of adhesives and the like because there are various methods of extraction of the oil content of the soya meal. Only low solubility soya meal was produced for a long time when heat treatment was used to extract the oil. The reason for the low solubility was that heat denatured a portion of the protein of the soya meal and the denatured protein was insoluble. During recent years solvent oil extraction processes have enabled the seed meal processors to remove the oil without heating and, therefore, the soya protein is less or not at all denatured and there is a larger percentage of the water soluble protein. Such high water soluble protein-content meals have high adhesive potentialities; but, however, are inherently accompanied by problems such as poor MacMichael viscosity characteristics and poor high-shear viscosity characteristics.

In accordance with the present invention a soy bean adhesive composition is prepared from a mixture of a full fiber soy bean flour of predetermined characteristics and a low fiber soy bean flour of predetermined characteristics, said adhesive being prepared in accordance with the proportions hereinafter set forth and described as Formulation X. Each of the soy bean flours utilized in preparing a composite soy bean blend has a "quick viscosity," herein referred to by the designation "QV," varying between the limits of about 60 and 85 or 90. The adhesive composition is formulated from a predetermined mix including the herein set forth composite soy bean flour and a liquid vehicle, said adhesive composition having, when the adhesive composition is one hour old, a MacMichael viscosity utilizing a No. 26 wire at 20 R. P. M. between about 85° and about 175°, and preferably between about 100° or about 105° and 120°. This adhesive composition also has a high-shear viscosity between the limits of about 4.7 and about 10 cm., and preferably between the limits of about 4.9 and about 6.3 cm. measured as herein described when the adhesive composition is one hour old, said adhesive composition having a two-hour high-shear viscosity which is only about 0.1 cm. more than to about 0.2 cm. less than the one-hour high-shear viscosity. While the QV of the soy bean flour should preferably be between about 60 and about 85, the upper limit may vary somewhat as, for example, it may be about 85 or about 87 or about 90.

The present invention will be described in connection with the following figures wherein:

Figure 1 is a diagrammatic sectional view showing the apparatus for carrying out a high-shear viscosity test for the adhesive composition of the present invention;

Figure 2 is a plane view of the impeller used in carrying out the herein described quick viscosity test;

Figure 3 is a side elevation of one of the impeller arms;

Figure 4 is a typical flow sheet illustrating the present invention.

In describing the present invention certain terminology is used, and a definition of the latter is now set forth.

(1) Protein meal—the flakes produced by extracting oil from a protein base.

(2) Soy meal—the flakes produced by extracting oil from soybeans.

(3) Protein glue—the dry powder formed by blending the protein flour with dry chemicals and other ingredients, said dry mixture being adapted to be mixed with water and other chemicals to form the final adhesive.

(4) Soy glue—the dry powder formed by blending soy flours with dry chemicals and other ingredients, said dry mixture being adapted to be mixed with water and other chemicals to form the final adhesive.

(5) Protein adhesive—the wet mixture formed by mixing the dry glue with water and other chemicals.

(6) Soy adhesive—the wet mixture formed by mixing the dry soy flour glue with water and other chemicals.

(7) Protein flour—the product formed by grinding the protein meal.

(8) Soy flour—the product formed by grinding soymeal.

(9) Water soluble protein (abbreviated "WSP")—the content of water soluble protein expressed as a percentage by weight taken on the dry protein meal.

(10) Protein solubility index—the percentage of protein which is water soluble.

(11) MacMichael viscosity, herein abbreviated as "MM"—the viscosity reading in degrees which a sample produces when tested with a No. 26 wire spindle in a MacMichael rotating viscosimeter which turns at 20 R. P. M. The spindle used in carrying out the different viscosity tests is the standard MacMichael spindle, 9.4 mm. in diameter and immersed 4.8 centimeters in the material being tested.

(12) High-shear viscosity, herein abbreviated as "HS"—the viscosity reading in centimeters produced on a Hercules High-Shear Viscosimeter, turning at 1310 R. P. M., as shown in Figure 1.

Protein flours, and especially those having a high water soluble protein content, are processed differently by different suppliers of the protein flour. Therefore, the MacMichael or MM viscosity of the adhesive prepared therefrom will vary considerably. Further, protein adhesives should preferably have a controlled high-shear viscosity, and in general the high-shear viscosity of the adhesive is usually between about 4.7 and about 10 cm. measured as herein described when the adhesive composition is one hour old, and desirably between the limits of 4.9 and 6.3 cm. measured as herein described, said adhesive being prepared in the proportions of the soy bean flour base and the liquid vehicle set forth in the herein described Formulation X.

If protein flours of high water soluble protein-content are blended, then a final adhesive composition may be formulated which will have a proper MM viscosity, determined as herein set forth, and a proper high-shear viscosity, measured as herein set forth.

It is desired to point out that the high-shear viscosity of the adhesive composition which is prepared from a soy bean base and an alkaline liquid vehicle, including soda ash, that is, sodium carbonate, and other components in situ producing caustic soda, decreases with time as the adhesive composition ages. This is due to the hydrolysis of the protein in the soy bean flour of the adhesive composition. The high-molecular-weight protein molecules are broken at central amide linkages because of the alkalinity of the liquid vehicle, and the resultant decrease in molecular weight causes a decrease in viscosity. The protein molecules also contain some CONH₂ groups, and when the latter hydrolyze ammonia is liberated. The odor of ammonia has long been a qualitative measure of the degree of protein hydrolysis. However, in accordance with the present invention, the high-shear viscosity may be plotted against the time of aging of the adhesive composition, and this serves as an accurate indicator or index of the progress of hydrolysis.

It is desired to point out that the blending of various protein flours experimentally, and the production of an adhesive composition from the blended flours is a tedious and costly operation, and does not lend itself readily to high-speed low-cost production of an adhesive composition.

In one form of the present invention a test, herein defined as the "Quick Viscosity" test has been devised, which will give an indication of the MM viscosity thereby expected from the finished adhesive composition prepared in accordance with a predetermined formulation, including a predetermined amount of soy bean base and liquid vehicle. The quick viscosity of the protein flour is hereinafter referred to as "QV."

Further, where a number of protein flours have been tested and each gives a different QV number, these flours can be blended in such amounts as to confer the proper MM viscosity and the proper high-shear viscosity on the finished adhesive prepared with a predetermined amount of sodium salts and other adhesive chemicals usually used in preparing a plywood adhesive.

The QV number of a protein flour as, for example, a soy bean flour, is the 30 minute MacMichael or MM viscosity produced by the following procedure:

*a.* Measure 180 ml. water into a 600 ml. beaker.
*b.* Add 20 ml. 0.1 N sulfuric acid.
*c.* Add 2.0 ml. normal octyl alcohol.
*d.* Add 50 grams ground soya meal sample.
*e.* Stir to remove most lumps. Avoid whipping to prevent foaming.
*f.* Agitate at 200 R. P. M. for 1 minute; longer if required to eliminate lumps, using impeller having three one inch square blades mounted in vertical planes tangent to three equally spaced 1¼" arms, as shown in Figure 2.
*g.* With a pipette, add 5.0 ml. 6 N sodium hydroxide and agitate at 200 R. P. M. for 5 minutes.
*h.* Quickly remove and pour sample into a MacMichael cup. Immediately start viscosimeter at 20 R. P. M., equipped with a No. 30 wire, and damp spindle with hand to obtain earliest possible reading. Reading values increase rapidly especially above 100 degrees MacMichael. Plot this reading as the "initial quick viscosity." Set timer for 10 minutes.
*i.* Pour viscosity sample back into remainder of mix and continue agitation at 200 R. P. M. At 10 minutes after initial reading resample and take MacMichael reading as in *h*. Plot reading as "10 minute quick viscosity."
*j.* Pour viscosity sample back into remainder of mix and continue agitation at 200 R. P. M. Set timer for 20 minutes. After 20 minutes, take MacMichael reading as in *h*. Plot reading as "30 minute quick viscosity."

In general, in accordance with the present invention, soy bean blends are made by mixing what is known as a full fiber soy bean flour with a low fiber soy bean flour. The full fiber soy bean flour is herein designated as "EVG" and the low fiber soy bean flour is herein designated as "Kaysoy." The full fiber flour, EVG, in general has an average fiber content of 6% and an average moisture content of 8½%, although these percentages may vary somewhat. In other words, the fiber content may be 5% or 5½% or 6½%, and the moisture content of the flour may be 8% or 9% or even 9½%. The preferred QV range for the full fiber soy bean flour of the present invention is between about 65 and about 85 or about 90 units, and the range of water soluble protein is desirably between about 32% and about 35% taken on the weight of the dry flour which is the flour that has between 6% or 8½% moisture.

The low fiber flour or Kaysoy has an average fiber content of about 3% and an average moisture content of about 6%. These percentages may also vary. The Kaysoy flour of the present invention may have a QV between about 65 and about 85 or 90 units. However, the desired range of WSP is between about 36 and 40%.

In accordance with the present invention, when a full fiber soy bean flour falls within the desired range of QV and WSP, it may be formulated into a dry glue and a certain proportion of a low fiber soy bean flour added. This dry glue may contain soda ash as, for example, 1% thereof, but, of course, the amount of the soda ash, sodium fluoride or other materials in situ generating in aqueous solution caustic soda, may be somewhat varied.

If the WSP of the full fiber flour as, for example, flour EVG is between 34 and 35%, a minimum amount of low fiber Kaysoy flour may be added as, for example, 5 to 15%. If the WSP of the full fiber flour is about 30% or 31%, then about 25 to 35% of the low fiber Kaysoy flour may be added to the full fiber soy bean flour, said percentages being taken on the dry weight of the composite mixture of the full fiber and low fiber soy bean flours. In some instances the low fiber flour may be added to the full fiber soy bean flour in amounts between 15% and 25% taken on the dry weight of the composite mixture of the full fiber and low fiber soy bean flours. In other words, the composite mixture may contain 15% to 25% of the low fiber flour and 85% to 75% of the full fiber flour.

In the plywood mills, dry glues prepared as above set forth are mixed with water and the usual chemical additives, the water ratio preferably being around 3.25. The water ratio for Formulation X, the laboratory mixing formulation, is 3.35.

Formulation Y sets forth the mill mixing formulation, and the water ratio is 3.25. This may be varied between 3.0 and 3.3.

Referring to the adhesive composition produced by blending full fiber soy bean flour and low fiber soy bean flour, it may be stated that if the high-shear viscosity of the adhesive composition is too low, that is below 4.7 cm. measured as herein set forth and when the adhesive composition is one hour old, then a greater proportion of the low fiber soy bean flour may be added to the full fiber soy bean flour. It is, therefore, clear that in accordance with the present invention for a given formulation containing a predetermined amount of soy bean flour, a given amount of sodium salts, or a given amount of salts which in situ generate caustic soda in the aqueous adhesive vehicle, and a predetermined amount of water, that is a ratio of water to solids ranging between 3.25 and 3.35, the latter figure being for Formulation X and the former figure being for Formulation Y, that a method has been provided for controlling the high-shear viscosity of the adhesive composition, said method comprising blending a full fiber soy bean flour with a low fiber soy bean flour, there being added 5 to 35% of the more expensive low fiber soy bean flour so as to bring the high-shear viscosity between the limits of about 4.7 and about 10 cm., and preferably between the limits of about 4.9 and about 6.3 cm., measured when the adhesive composition is one hour old. The water ratio is the ratio between the weight of water added to the dry glue and the weight of the dry glue, including the protein or soy bean flour, the caustic and other dry chemicals.

It has also been discovered that the difference in the percentage of WSP present in each of the above set forth types of soy bean flours influences the high-shear viscosity of an adhesive formulated and controlled in the manner herein set forth, and that the high-shear viscosity can be brought to within the desired range herein set forth by mixing a full fiber flour and a low fiber flour of different WSP content.

A method has also been devised of insuring a quick formulation of a satisfactory mill formula containing soy bean flours of the character herein set forth by determining the QV of the flours.

It has also been discovered that if the QV of one type of flour is too low, then it is mixed with a soy bean flour, the QV of which is relatively high, to provide an adhesive composition having, when the adhesive composition is one hour old, an MM viscosity between the limits of about 85° and 175°, and preferably between about 100° and 120°.

It may be stated that an adhesive composition which is adjusted to the optimum caustic content gives a two-hour high-shear viscosity or HS which is only about 0.1 cm. more than to about 0.2 unit less than the one-hour high-shear viscosity. If a given adhesive mixture or composition has a two-hour HS reading which exceeds the one-hour reading by more than 0.1 cm. addition of sufficient soda ash or equivalent to the dry glue will give, when prepared in accordance with Formulation X, an adhesive composition of optimum caustic concentration.

The amount of soda ash or equivalent which is added to the dry glue is determined by the test set forth, that is only enough soda ash or equivalent is added so that the two-hour high-shear viscosity is between 0.1 cm. more than and 0.2 unit less than the one-hour high-shear viscosity. Instead of soda ash any sodium salt may be used which releases caustic when added to lime as, for example, sodium fluoride and sodium phosphate. This method of control is an important feature and object of the invention since the higher WSP glues or those having a WSP content between 34 and 40% or between 36 and 40% are more sensitive than the lower WSP glues to the addition of salts which incorporate alkali in the adhesive composition. In addition, the sodium salts lower the level of both the MM and HS viscosity of the final adhesive composition all along the viscosity-time-curve plotted for a given adhesive.

The following is a specific example illustrating the blending of flours of medium QV rather than low QV.

EXAMPLE I 80 parts of soy bean flour, designated EVG 350 was mixed with 15 parts of a flour, designated as "Kaysoy 143." There was added thereto one part of soda ash and one part of sodium fluoride, and these dry materials were blended to form the dry glue. The protein flour, designated EVG 350 had a QV, determined as herein set forth, of 81 and a WSP content of 33.9%, taken on the weight of the dry meal, said dry meal having an average moisture content of 8% and an average fiber content of 6%. The protein flour, designated Kaysoy 143 had a QV of 74, determined as herein set forth and a WSP content of 32.3%, taken on the dry weight of the soya bean flour having an average moisture content of 6%, and an average fiber content of 3%. It is to be understood that when the term "dry protein flour" or the term "dry soy bean flour" is used in the present specification, it means a protein flour which contains on the average about 6% of moisture.

The protein flours of the above characteristics were blended and then treated according to Formulation X, a suitable amount of anti-foam being added as, for example, 3 parts, to form an adhesive composition which gave an initial MM viscosity of 87, a one-hour MM viscosity upon aging of 112, and a two-hour MM viscosity of 124 units. The initial high-shear viscosity of the adhesive was 4.4, the one-hour high-shear viscosity was 5.7, and the two-hour viscosity was 5.6. If mill Formulation Y, rather than the laboratory mixing Formulation X, had been followed, the MM viscosity would have varied from its initial viscosity to the two-hour viscosity reading between the limits of 150 and 170, and the high-shear viscosity reading would have varied from an initial viscosity to a two-hour viscosity between the limits of 6.6 and 7.5. The one-hour high-shear viscosity of the finished adhesive composition was well above the preferred minimum of 4.9 cm.; hence the ratio of EVG to Kaysoy may be increased slightly.

The effect on the MM and HS viscosities of two different protein flours, and more specifically a soy bean flour, of increasing the salt content, that is the soda ash content, by 1½% is shown in the following example, Example II, wherein protein soy bean flour I had a WSP of 39.7 and protein flour II had a WSP of 27.2. However, both of these protein flours had exactly the same QV number of 43, which is considerably lower than the optimum QV desired in the blend of protein flours of the present invention. This example shows the effect of low WSP in giving low high-shear viscosity values and the effect of low QV in giving a low MM viscosity value. The above is of paramount importance.

EXAMPLE II

| Glue Composition | Viscosity | | |
| --- | --- | --- | --- |
| | Initial | One-hour | Two-hour |
| Ia | | | |
| 380 g. Flour I (WSP 39.7) | | | |
| 4 g. soda ash (1.0%) MM | 55 | 105 | 121 |
| 4 g. Sodium fluoride (1.0%) HS | 5.4 | 6.5 | 7.2 |
| 12 g. Anti-foam (3.0%) | | | |
| Ib | | | |
| 374 g. Flour I (WSP 39.7) | | | |
| 10 g. Soda ash (2.5%) MM | 46 | 91 | 112 |
| 4 g. Sodium fluoride (1.0%) HS | 4.7 | 5.6 | 5.7 |
| 12 g. Anti-foam (3.0%) | | | |
| IIa | | | |
| 388 g. Flour II (WSP 27.2) | 79 | 113 | 140 |
| 12 g. Anti-foam (3.0%) | 4.0 | 5.1 | 5.4 |
| IIb | | | |
| 382 g. Flour II (WSP 27.2) | | | |
| 4 g. Soda ash (1.0%) MM | 57 | 74 | 91 |
| 2 g. Sodium fluoride (0.5%) HS | 3.2 | 3.9 | 4.0 |
| 12 g. Anti-foam (3.0%) | | | |

The low WSP protein flour required 1.5% total sodium salts, that is soda ash and sodium fluoride, to give a 0.1 unit spread expressed in centimeters between the one-hour and two-hour HS values, while the flour having a WSP of 39.7 required 3.5% total sodium salts, as shown in glue composition Ib for the same spread.

The great difference in the one-hour HS viscosity value for Ib which was 5.6 and for IIb which was 3.9 shows that the high WSP protein flour produces high HS viscosity adhesive compositions.

The foregoing indicates that the high water soluble protein content glues might be useful to produce adhesive compositions if the glue had the correct MM and HS viscosity characteristics, and these correct viscosity characteristics are imparted to the flours which are the subject matter of the present invention by rejecting flours having a QV outside the range of 60 to 85 or 90, and then by blending to produce a composite protein flour having a QV between 60 and 85 or 90, which when compounded with other ingredients as set forth in the proportions of Formulation X forms an adhesive composition having a one-hour MM viscosity of about 85° to 175° and preferably between about 100° and 120°, and, further, forms an adhesive composition having a one-hour high-shear viscosity, as determined on the Hercules High-Shear Viscosimeter when turning at 1310 R. P. M., between the limits of about 4.7 and about 10 cm., and preferably between the limits of about 4.9 and 6.3 cm., the adhesive composition being formulated with the ingredients thereof in the proportions as set forth in Formulation X.

While, as stated, in most cases the protein flours used are blended flours, it is within the province of the present invention to carry out the solvent extraction to remove the oil of the soy bean flour in such a manner that the processed protein flour will have a one-hour high-shear viscosity between the limits of about 4.7 and 10 cm., and desirably between the limits of about 4.9 and 6.3 cm., with the ingredients set forth and in the relative proportions of Formulation X.

The following compilation is the laboratory mixing formulation used in testing soy bean flour to ascertain whether said flours produce satisfactory adhesive compositions.

*Laboratory mixing Formulation X*

| | | |
|---|---|---|
| Water at 25° C | ml | 840 |
| Soy glue | grams | 400 |

Mix 5 minutes on Hobart mixer at No. 1 speed.

| | | |
|---|---|---|
| Water at 25° C. | ml | 500 |

Mix 2 minutes at No. 1 speed. Scrape pot.

| | | |
|---|---|---|
| 33⅓% lime slurry | grams | 144 |

Stir 80 seconds.

| | | |
|---|---|---|
| 33⅓% caustic soda | do | 72 |

Stir 80 seconds.

| | | |
|---|---|---|
| Sodium silicate ("N" grade 37.6% solids) | do | 100 |

Stir 80 seconds.

| | | |
|---|---|---|
| No. 12 solution | do | 7.0 |

Stir 8 minutes at No. 1 speed.

NOTE.—No. 12 solution is a mixture of carbon disulfide and carbon tetrachloride, with 75% carbon disulfide. Soy glue consists of soy flour, plus sodium salts which react with lime to produce caustic, plus antifoam which may be introduced separately into the 840 ml. of water—the flour, sodium salts and antifoam totalling 400 grams.

The following compilation is the mill mixing formulation used for producing an adhesive composition, said formulation being herein identified as Formulation Y.

*Mill Mixing Formulation Y*

| | Pounds |
|---|---|
| 100 lb. sack of soy glue | 100 |
| Water | 175 |

Mix 7 minutes.

| | |
|---|---|
| Water | 150 |

Mix 2 minutes.

| | |
|---|---|
| Lime | 12 |
| In water | 24 |

Short stir.

| | |
|---|---|
| Flake caustic soda | 6 |
| In water | 12 |

Short stir.

| | |
|---|---|
| Silicate of soda | 25 |

Short stir.

| | |
|---|---|
| No. 12 solution | 1¾ |

Mix 5 minutes.

NOTE.—Soy glue consists of soy flour, plus sodium salts which react with lime to produce caustic, plus antifoam—these materials being blended as indicated in Figure 4.

EXAMPLE III 75 parts by weight of the dry full fiber soy bean flour EVG of the character herein set forth, having a QV of 71 and a WSP of 29%, was blended with 20 parts by weight of dry Kaysoy flour, having a QV of 86 and a WSP of 37%. The dry glue, therefore, had 75% of the EVG flour and 20% of the low fiber Kaysoy flour. The dry flour had added thereto one part of soda ash and one part of sodium fluoride. The resulting dry glue was then converted into an adhesive composition by mixing with water containing 3 parts of antifoam, in the ratio herein set forth using Formulation X. The high-shear viscosity at the end of one hour was 5.1 cm., and at the end of two hours it had increased very little, and namely about 0.1 cm. The one-hour MM viscosity of the resulting adhesive composition was about 115, and the two-hour MM viscosity was about 120.

EXAMPLE IV 75 parts by weight of the dry full fiber soy bean flour EVG of the character herein set forth, having a QV of 74 and a WSP of 32%, was blended with 20 parts by weight of the dry Kaysoy flour, having a QV of 86 and a WSP of 37%. The dry glue, therefore, had 75% of the EVG flour and 20% of the low fiber Kaysoy flour. The dry flour had added thereto one part of soda ash and one part of sodium fluoride. The resulting dry glue was then converted into an adhesive composition by mixing with water containing 3 parts of antifoam, in the ratio herein set forth using Formulation X. The high-shear viscosity at the end of one hour was 5.4 cm., and at the end of two hours it had increased very little, and namely about 0.1 cm. The one-hour MM viscosity of the resulting adhesive composition was about 115, and the two-hour MM viscosity was about 120.

EXAMPLE V 70 parts by weight of the dry full fiber soy bean flour EVG of the character herein set forth, having a QV of 73 and a WSP of 32%, was blended with 25 parts by weight of dry Kaysoy flour, having a QV of 82 and a WSP of 38%. The dry glue, therefore, had 70% of the EVG flour and 25% of the low fiber Kaysoy flour. The dry flour had added thereto one part of soda ash and one part of sodium fluoride. The resulting dry glue was then converted into an adhesive composition by mixing with water containing 3 parts of antifoam, in the ratio herein set forth using Formulation X. The high-shear viscosity at the end of one hour was 5.3 cm., and at the end of two hours it had increased very little, and namely about 0.15 cm. The one-hour MM viscosity of the resulting adhesive composition was about 118, and the two-hour MM viscosity was about 125.

The following table illustrates the different characteristics of high and low water soluble protein soy bean flours.

TABLE II

| WSP Content* Range | Up to 14% | 14–28% | 28–32% | 32–36% | 36–41% |
|---|---|---|---|---|---|
| Pat test | Non sticky | Non sticky | Moderately sticky | Sticky | Very sticky. |
| Odor | Toasted | Not green: Not toasted. | Green odor detectable. | Green | Very green. |
| Lumping in water mix | None | None | Slight | Moderate | Severe. |
| Possible types of glue by alkalinity. | High Caustic | (1) medium caustic; (2) high caustic. | (1) Low caustic; (2) medium caustic. | Low caustic | None except possibly low caustic. |
| Amount of CS₂ | High | (1) medium; (2) high. | (1) medium; (2) high. | Medium | Medium or low. |
| Water ratio (wt. water to wt. glue). | 3.0 to 3.25 | (1) 3.25; (2) 3.0 | (1) 3.25; (2) 3.0 | Maximum, 3.1 | Less than 3.0. |
| PSI (Protein Solubility Index)** | 0–35 | 35–65 | | 65–73 | 73–78. |

NOTE. Data is for conventional hammer-mill-ground soy meal. WSP figures are based on average moisture content of 8% and average fiber content of 6%.
*American Soya Flour Association test. Tentative method dated Dec. 10, 1946.
**The PSI is a more refined measurement of the treatment of meals than is WSP, and can be used to compare defibered flours with full-fibered ones.

Referring to Figure 1, the Hercules High-Shear Viscosimeter comprises a cup A disposed in a cup C which is mounted on a ball bearing cup holder D, and disposed in the cup A is a bob B. The glue sample, that is the adhesive composition, in its viscous liquid form is placed in the cup A and the bob B is then lowered into position. The glue is forced upward around the bob B and forms a slight roll at its upper diameter. The bob is rotated at 1310 R. P. M. The bob diameter is 1 7/16", the vertical height of the cone forming the tip of the bob is 3/8". The inner diameter of the cup is 1 9/16". The vertical clearance between the bob and the bottom of the cup is 9/16". The torque applied to cup holder C is measured by a spring. The readings are expressed in terms of displacement of the spring in centimeters. The Hooke's law constant of the spring is 43,700 dynes per centimeters. This measurement is made at 25° C.

Referring to Figures 2 and 3 the impeller 1 is provided with impeller arms 2, 3 and 4 spaced preferably 120° apart. The impeller arms extend from the central mounting member 5 for a distance of about 1¼ inches and each arm is provided with a flag 6 which has a length of about one inch. These flags have dimensions of ¾ inch by one inch.

The present application is a contiuation-in-part of each of the following applications: Serial No. 116,389; Serial No. 116,390, both filed September 17, 1949.

What is claimed is:

1. A dry soya bean glue base consisting essentially of a full-fiber soya bean flour having a WSP-content between about 28% and 36% in admixture with a low-fiber soya bean flour in an amount between the limits of about 5% and about 35% taken on the dry weight of the composite mixture of said full-fiber and low-fiber soya bean flours, said low-fiber soya bean flour having a WSP-content between about 36% and about 40%, said percentages of WSP-content being taken on the dry weights of the respective flours.

2. A dry composition adapted on admixture with a liquid vehicle to form a glue comprising (a) a dry soya bean glue base consisting essentially of a full-fiber soya bean flour having a WSP-content between about 28% and 36% in admixture with a low-fiber soya bean flour in an amount between the limits of about 5% and about 35% taken on the dry weight of the composite mixture of said full-fiber and low-fiber soya bean flours, said low-fiber soya bean flour having a WSP-content between about 36% and about 40%, said percentages of WSP-content being taken on the dry weights of the respective flours; and (b) a material which upon the addition of water in situ generates caustic soda.

3. A dry composition adapted on admixture with a liquid vehicle to form a glue comprising (a) a dry soya bean glue base consisting essentially of a full-fiber soya bean flour having a WSP-content between about 28% and 36% in admixture with a low-fiber soya bean flour in an amount between the limits of about 5% and about 35% taken on the dry weight of the composite mixture of said full-fiber and low-fiber soya bean flours, said low-fiber soya bean flour having a WSP-content between about 36% and about 40%, said percentages of WSP-content being taken on the dry weights of the respective flours; and (b) a material which upon the addition of water and in the presence of lime in situ generates caustic soda.

4. The dry soya bean glue base as defined in claim 1 in which each of the soya bean flours has a 30-minute MM viscosity within the range of about 60° to 90° when each of said flours is admixed with water and sodium hydroxide in the ratio of 50 grams of soya bean flour, 180 ml. of water, and sodium hydroxide in an amount equivalent to about 5.6 ml. of 6 normal sodium hydroxide, and agitating the mixture for a period of 30 minutes.

5. An aqueous adhesive composition comprising a soya bean base and an aqueous alkaline vehicle therefor, said soya bean base consisting essentially of a full-fiber soya bean flour having a WSP-content between about 28% and about 36%, said full-fiber soya bean having the property of producing a low high-shear viscosity aqueous adhesive composition, there being blended with said full-fiber soya flour a low-fiber soya bean flour in an amount between about 5% and about 35% taken on the weight of the dry mixture of said full-fiber and low-fiber soya bean flours, said low-fiber soya bean flour counteracting the tendency of said full-fiber soya flour to produce a low high-shear viscosity aqueous adhesive composition, said low-fiber soya flour producing in combination with said full-fiber soya flour in an aqueous alkaline vehicle an adhesive composition having a one-hour MM viscosity utilizing a 26 wire at 20 R. P. M. between the limits of about 85° and about 175°, the MM viscosity being greater at the end of said time period than at the beginning, said aqueous adhesive composition having a one-hour shigh-shear viscosity between the limits of about 4.7 and about 10 c. m., and a two-hour high-shear viscosity which is only about 0.1 cm. more to about 0.2 cm. less than the one-hour high-shear viscosity.

6. An aqueous adhesive composition as defined in claim 5 which has a one-hour high-shear viscosity between the limits of 4.9 and about 6.3 cm.

7. An aqueous adhesive composition as defined in claim 5 in which there is present the reaction product of lime and an alkali silicate.

8. An aqueous adhesive composition as defined in claim 5 wherein the full-fiber soya bean flour and the low-fiber soya bean flour each prior to its introduction into the adhesive composition has a 30-minute MM viscosity between about 60° and about 90° when formulated and tested for viscosity by mixing soya bean flour, water, and sodium hydroxide in the ratio of 50 grams of soya bean flour, 180 ml. of water, and sodium hydroxide in an amount equivalent to about 5.6 ml. of 6 normal sodium hydroxide, and agitating the mixture for a period of 30 minutes.

References Cited in the file of this patent
UNITED STATES PATENTS

| | | |
|---|---|---|
| 1,976,435 | Cone et al. | Oct. 9, 1934 |
| 2,097,239 | Bradshaw | Oct. 26, 1937 |
| 2,174,438 | Corwin et al. | Sept. 26, 1939 |
| 2,446,954 | Redfern | Aug. 10, 1948 |
| 2,484,878 | Eberl | Oct. 18, 1949 |

OTHER REFERENCES

Soybeans and Soybean Products, Markley, pages 439–440, vol. I